US009094912B2

(12) United States Patent
Haro et al.

(10) Patent No.: US 9,094,912 B2
(45) Date of Patent: Jul. 28, 2015

(54) APPARATUS AND METHOD OF PROVIDING CONNECTION SOURCE RECOMMENDATIONS USING A DATABASE OF HISTORIC DATA ON CONNECTIVITY

(71) Applicant: Life360, Inc., San Francisco, CA (US)

(72) Inventors: Alexander Haro, San Francisco, CA (US); Christopher Hulls, Point Reyes, CA (US); Michael Borsuk, San Francisco, CA (US); Michael Hood, San Francisco, CA (US)

(73) Assignee: LIFE360, INC., San Francisco, CA (US)

( * ) Notice: Subject to any disclaimer, the term of this patent is extended or adjusted under 35 U.S.C. 154(b) by 0 days.

(21) Appl. No.: 14/076,021

(22) Filed: Nov. 8, 2013

(65) Prior Publication Data

US 2015/0133144 A1 May 14, 2015

(51) Int. Cl.
*H04W 24/00* (2009.01)
*H04W 52/02* (2009.01)
*H04W 64/00* (2009.01)

(52) U.S. Cl.
CPC .......... *H04W 52/0209* (2013.01); *H04W 64/00* (2013.01)

(58) Field of Classification Search
CPC ..... H04W 4/02; H04W 64/00; H04W 64/003; H04W 4/027; H04W 4/16; H04W 64/006; H04W 52/228; H04W 84/005; H04W 4/022; H04W 52/0258; H04W 8/08
USPC ...................................................... 455/456.1
See application file for complete search history.

(56) References Cited

U.S. PATENT DOCUMENTS

| 5,590,396 | A | 12/1996 | Henry |
| 6,317,593 | B1 | 11/2001 | Vossler |
| 6,347,216 | B1 | 2/2002 | Marko et al. |
| 7,013,148 | B1 | 3/2006 | Ganesh |
| 7,505,795 | B1 | 3/2009 | Lim et al. |
| 7,565,148 | B2 | 7/2009 | Alicherry et al. |
| 8,306,748 | B2 | 11/2012 | Huseth et al. |
| 8,666,373 | B2 | 3/2014 | Dessouky et al. |
| 2011/0207411 | A1* | 8/2011 | Phillips ...................... 455/67.11 |
| 2013/0157711 | A1* | 6/2013 | Lee et al. ...................... 455/525 |

* cited by examiner

*Primary Examiner* — Kwasi Karikari
(74) *Attorney, Agent, or Firm* — Blakely Sokoloff Taylor & Zafman LLP

(57) ABSTRACT

A method of providing connection source recommendations using a database of historic data on connectivity starts with a processor receiving location and connection information from each mobile device. Location information may identify a location of each mobile device, respectively. Connection information may identify one of the connection sources as a preferred connection source used to identify the location of each mobile device, respectively. Processor may then store, in database, location and connection information. Database may include a plurality of location information and a history of connection information for each location information. When processor determines that mobile device has changed location, processor may transmit to mobile device connection information recommendation based on an analysis of database. Processor may transmit conservation command to each mobile device, respectively, to reduce operation of sensors to connection sources other than the preferred connection source for each mobile device, respectively. Other embodiments are described.

18 Claims, 9 Drawing Sheets

APPARATUS AND METHOD OF PROVIDING CONNECTION SOURCE RECOMMENDATIONS USING A DATABASE OF HISTORIC DATA ON CONNECTIVITY

FIELD

Embodiments of the invention relate generally to an apparatus and method of providing connection source recommendations using a database of historic data on connectivity. More specifically, the apparatus and methods may signal to the mobile devices to reduce operation of sensors to connection sources other than a preferred connection source for each of the mobile devices, respectively.

BACKGROUND

Currently, smart mobile phones and other mobile devices include mapping applications that may be used to show the user of the mobile device his current location on the mobile device's display. These applications may also be used to navigate the user to a destination based on his current location to a given destination. In some applications, the user's location is tracked and onscreen and audio directions are provided to the user. Accordingly, identifying the location of mobile devices has become a need in many applications such as geo-fencing, geo-location, mobile tracking and personal identification etc.

In order to ensure functionality of these applications, the mobile devices include multiple sensors used to communicate with communication sources such as local wireless towers, local WiFi access points, global positioning systems (GPS), and cell towers in a network in order to determine and track the mobile device's location. The current location fixing methods include using the GPS data directly, or triangulation using the local wireless towers and local WiFi or other available sensors.

However, the constant use of the multiple sensors included in the mobile devices may decrease the battery power of the mobile devices.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

In the description, certain terminology is used to describe features of the invention. For example, in certain situations, the terms "component," "unit," "module," and "logic" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). Of course, the hardware may be alternatively implemented as a finite state machine or even combinatorial logic. An example of "software" includes executable code in the form of an application, an applet, a routine or even a series of instructions. The software may be stored in any type of machine-readable medium.

Figure 1:
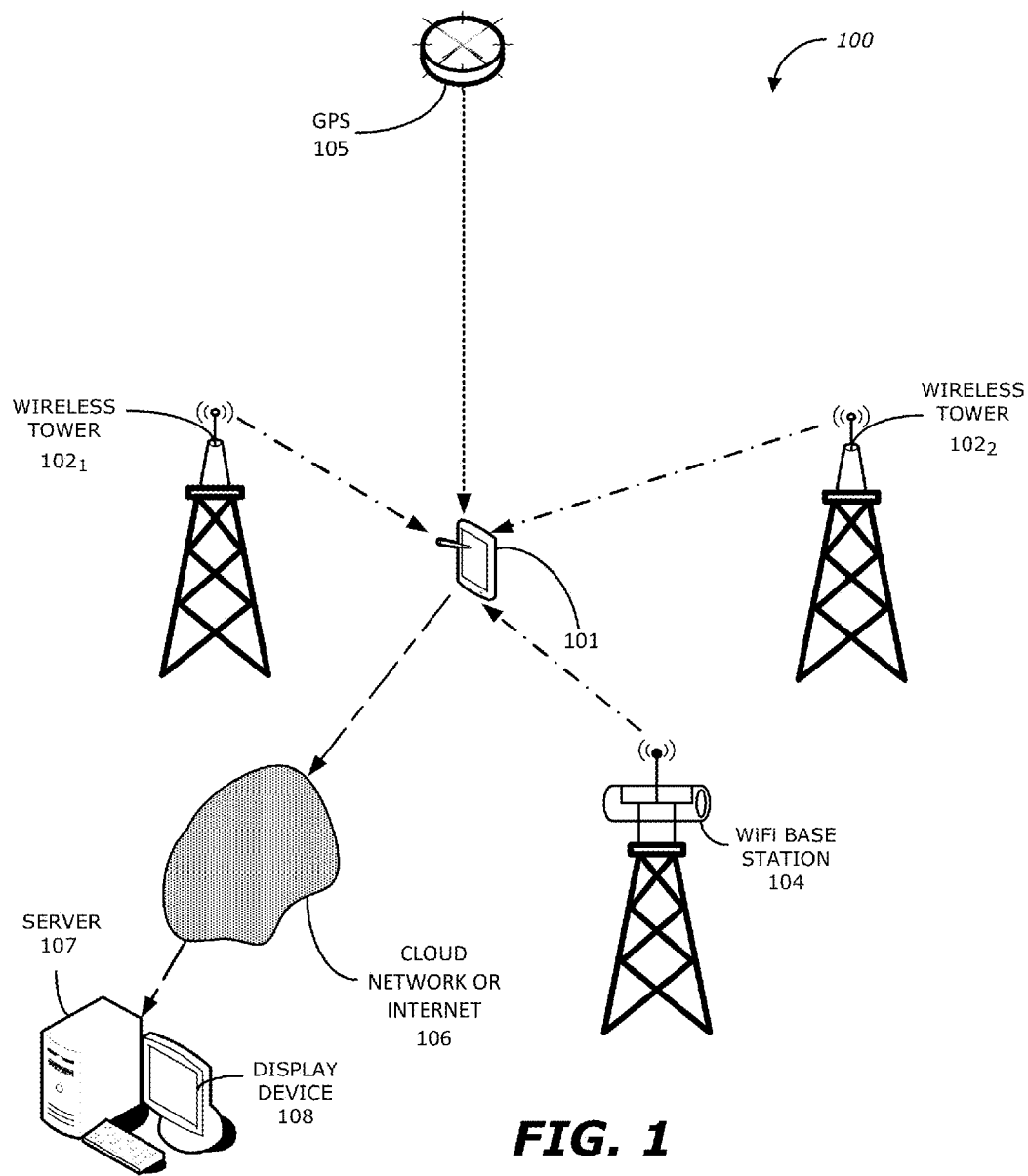
FIG. 1 illustrates a prior art system for determining and tracking the location of a mobile device.

FIG. 1 illustrates a prior art system for determining and tracking the location of a mobile device. The system 100 illustrates a mobile device 101 being tracked which may be portable computers such as laptop, notebook, tablet, and handheld computers or may also take the form of other types of devices, such as mobile telephones, media players, personal data organizers, handheld game platforms, cameras, and/or combinations of such devices. The tracking server 107 included in the system 100 links to the registered mobile device 101 over a network 106 (e.g., Cloud Network or Internet) to collect and transfer location data. Specifically, the server 107 receives location information from the mobile device 101 and displays the location of the mobile device 101 on the display device 108. The location of the mobile device 101 may also be displayed on a display of the mobile device 101. The mobile device 101 may extract its location information by using its internal sensors and/or radios and by connecting to the Global Positioning System (GPS) 105. The mobile device 101 may also extract its location data by using its internal sensors and/or radios and by triangulation using the cellular towers $102_1$-$102_3$ and/or any available WiFi access points (not shown). The location information from mobile device 101 is generated and transmitted to the tracking server 107 over the network 106.

Figure 2:
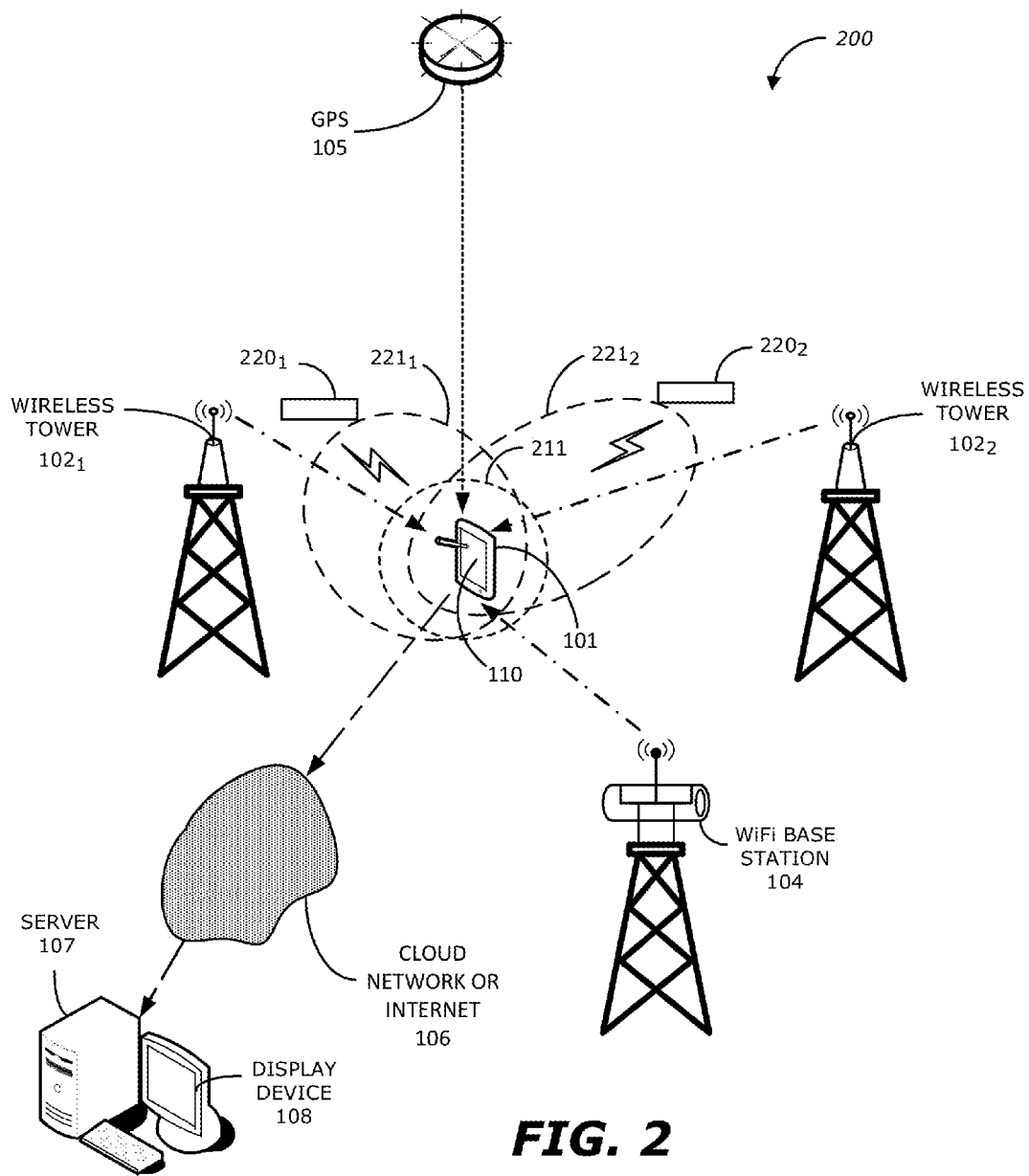
FIG. 2 illustrates the prior art system identifying the connection sources for determining and tracking the location of the mobile device.

FIG. 2 illustrates the prior art system identifying the connection sources for determining and tracking the location of the mobile device. The system 200 illustrates the possible connections to connection sources based on the location of the mobile device 101. The mobile device 101 is illustrated in FIG. 2 as being at a (map) location 211. As shown in FIG. 2, at the location 211, the mobile device 110 may establish connections to at least one of: the GPS 105, cell towers $102_1$-$102_3$, and WiFi hotspots $221_1$-$221_2$ generated by the WiFi access points $220_1$ and $220_2$. The mobile device 110 will search for all these possible connection sources and connect to the best available connection using the sensors and/or radios to each of these connection sources. In prior art system 200, this search and connection operation performed by the mobile device 110 is a continuous process and use up the battery power and the CPU capabilities of the mobile device 110 that could be used for other applications. However, based on the location of the mobile device 110, only some of the possible connection sources may provide a reasonable connection.

In one embodiment, a server may provide a recommendation of a connection source using historic connection information. The recommendation of the connection source indicates the preferred or best connection source for a mobile device based on the mobile source's current location. In one embodiment, the mobile device verifies if the recommended connection source is the preferred connection source (e.g., the connection source with the strongest signal). If the recommended connection source is verified to be the preferred connection source, the mobile device may establish a connection to the recommendation source. In one embodiment, once verified and connections are established by the mobile device, the server may provide a command to mobile device to shut off or reduce the search for other connection sources available for connection at that location.

Accordingly, in one embodiment, the server determines a recommended connection source, based on the location of a mobile device without using direct information from other users but rather using historical information stored in a database. The server in this embodiment of the invention takes into account both accuracy and battery life to determine which connection source is the preferred connection source to perform geographic locating of the mobile device based on the mobile device's current location. In case of low battery in the mobile device, the server may also shut down the search by alternate connection sources to conserve the charge for emergency use.

Figure 3:
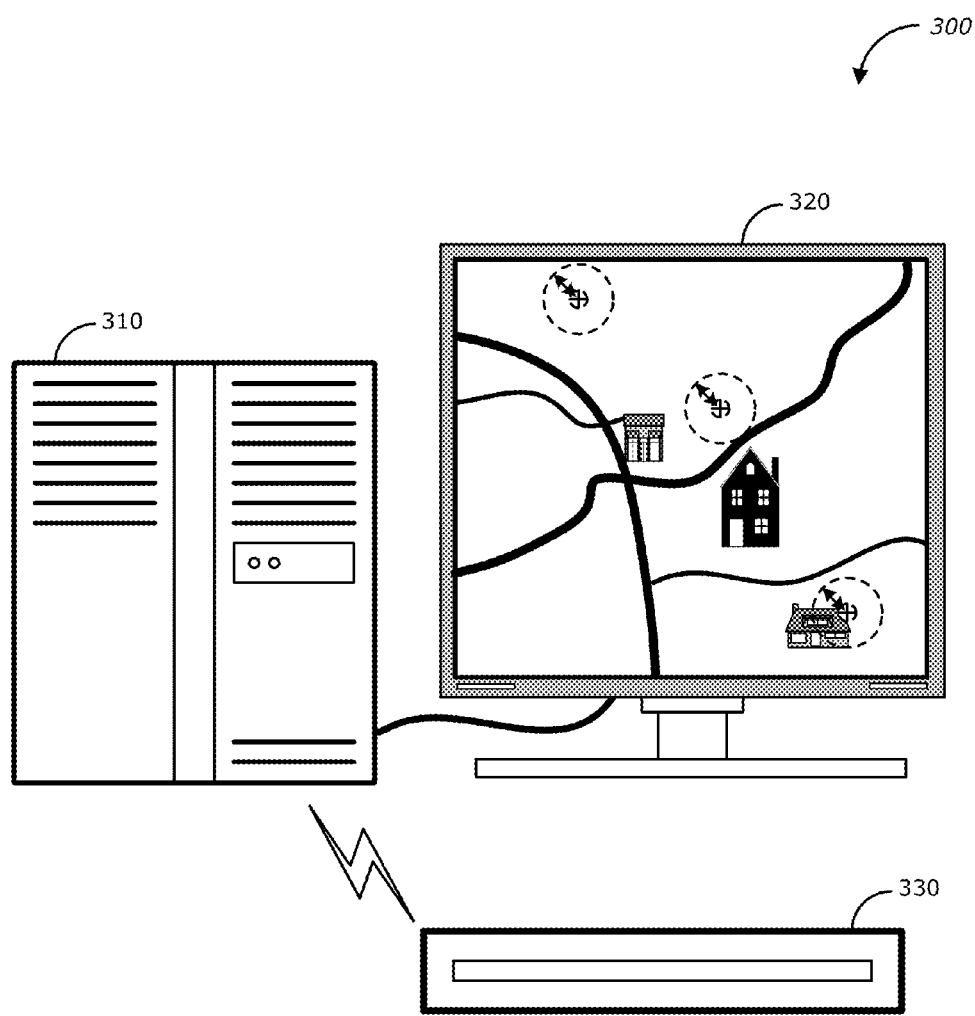
FIG. 3 illustrates a system for providing connection source recommendations using a database of historic data on connectivity according to an embodiment of the invention.

FIG. 3 illustrates a system for providing connection source recommendations using a database of historic data on connectivity according to an embodiment of the invention. As illustrated in FIG. 3, the system 300 includes a server 310 that is coupled to an input unit 330 and a display device 320. The system 300 may replace the server 107, display device 108 and a keyboard in FIG. 2. The input unit 330 may be a keyboard that allows the user to input commands to the server 310 and display device 108. The display device 108 may display the location of mobile devices being tracked by the server 310 on a map display of a geographic location.

The server 310 may communicate with the mobile device 110 over a network 106 (e.g., Internet, Cloud Network). While only one mobile device 110 is illustrated in FIG. 2, the server 310 may communicate with a plurality of mobile devices that may be explicitly registered and linked with the server 310 that tracks the location of the mobile devices. The server 310 may receive location and communication information from the mobile devices. For instance, the location data received from the mobile device 110 may include a fixed location of the mobile device 110. The connection information received from the mobile device 110 may identify one of a plurality of connection sources (e.g., the GPS 105, cell towers $102_1$-$102_3$, WiFi access points $220_1$-$220_2$) as a preferred connection source used to identify the location of the mobile device 110. As a first alternative, the mobile device 110 may extract its location information by using its internal sensors and/or radios and by connecting to the Global Positioning System (GPS) 105. In this embodiment, the mobile device 110 may determine that the preferred connection source is the GPS 105 at that location 211 and thus, the connection information provided to the server 310 identifies the GPS 105. As a second alternative, the mobile device 110 may extract its location information by using its internal sensors and/or radios and by triangulation using the cell towers $102_1$-$102_3$. In this embodiment, the mobile device 110 may determine that the preferred connection source includes the cell towers $102_1$-$102_3$ at that location 211 and thus, the connection information provided to the server 310 identifies the cell towers $102_1$-$102_3$. The server 310 may store in a database, the location information and the connection information received from the mobile device 110. The database may store a history of connection sources that are preferred connection sources for each location.

Figure 4:
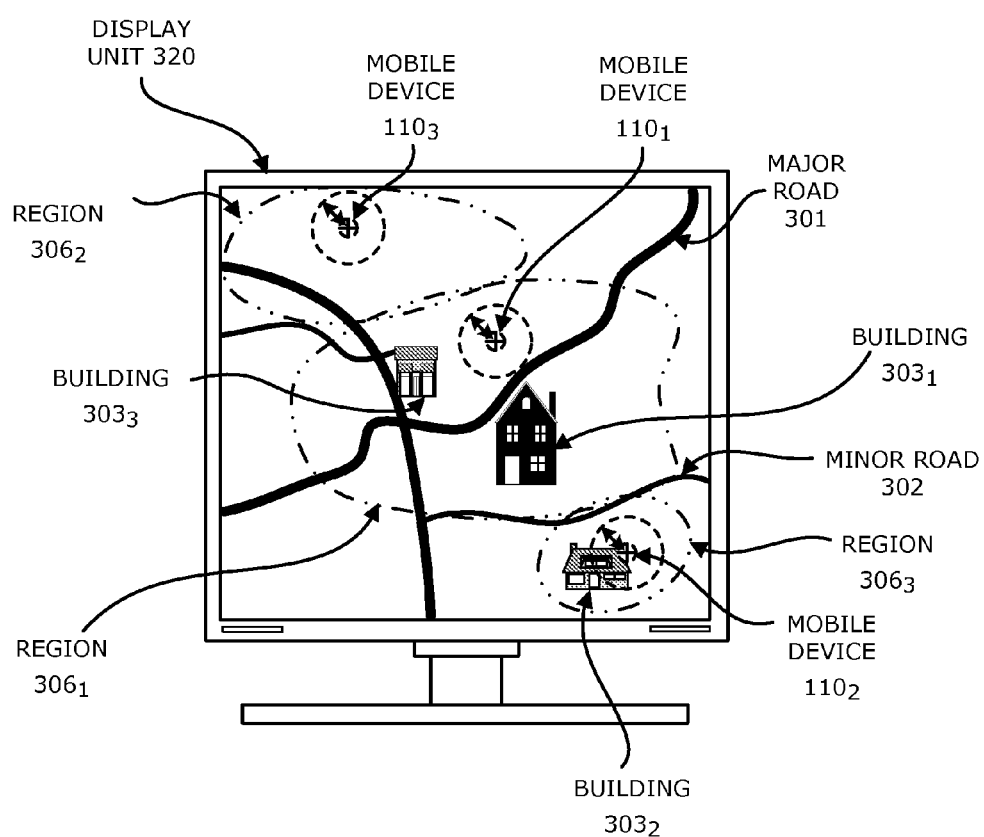
FIG. 4 illustrates the displayed location of mobile devices using the system according to the embodiment of the invention in FIG. 3.

FIG. 4 illustrates the displayed location of mobile devices using the system according to the embodiment of the invention in FIG. 3. The display 400 on a display device 320 includes a representation a map with major roads 301, minor roads 302 and buildings $303_1$-$303_3$. The map also includes the locations of a plurality of mobile devices are registered with the server 310 to be tracked such as the mobile devices $110_1$-$110_3$. As illustrated in FIG. 4, the display 400 may also include a plurality of regions such as regions $306_1$-$306_3$. Based on the history of preferred connection sources as stored in the database in the server 310, in one embodiment, the region $306_1$ may be associated with cell towers $102_1$-$102_3$. Accordingly, the optimum method of determining and tracking the location of mobile devices within region $306_1$ may be triangulation using the cell towers $102_1$-$102_3$. Similarly, in one embodiment, the region $306_2$ may be associated with GPS 105 and the region $306_3$ may be associated with the WiFi access points $220_1$-$220_2$ that are provided in the building $303_2$. Thus, based on the data included in the database, the best method of determining and tracking the location of a mobile device in region $306_2$ is using GPS 105 and in region $306_3$ is using the WiFi access point $220_1$-$220_2$. The boundaries of the regions $306_1$-$306_3$ may also be stored in the database included in the server 310. In some embodiments, from the stored historic data stored, a preferred connection record is generated that links the optimal communication source of each region along with the boundaries of each region.

As the mobile device $110_1$ moves from one region $306_1$ to another region $306_3$, where the optimum connection source is different, the server 310 may look up in the database the preferred connection record for the region $306_3$ that is stored therein. The server 310 may then provide the recommended connection information for the region $306_3$ to the mobile device $110_1$. This recommended connection information is then verified by the mobile device $110_1$ to determine if it is the best (or preferred) connection source. If verified to be preferred connection source, the mobile device $110_1$ establishes a connection with the recommended connection. If the mobile device finds that a different connection source is better or preferred, the mobile device $110_1$ establishes a connection with that different connection source. The different connection source's information is transmitted back to the server 310 to update the database and the preferred connection record.

Once the preferred connection source is established and confirmed by each of the mobile devices $110_1$-$110_3$, the server 310 is able to request reduced use or even shut down of the sensors and/or radios on the mobile devices $110_1$-$110_3$ that are used by communication sources other than the preferred communication source of each of the mobile devices $110_1$-$110_3$ based on their respective locations. For instance, if mobile device $110_2$ is at a location within the region $306_3$ that is associated with the WiFi access point $220_1$ as the preferred connection source, the mobile device $110_2$'s sensors and/or radios to communication sources other than the WiFi access point $220_1$ may remain in reduce use or shut down for the period of time that the mobile device $110_2$ remains in region $306_3$.

Figure 6:
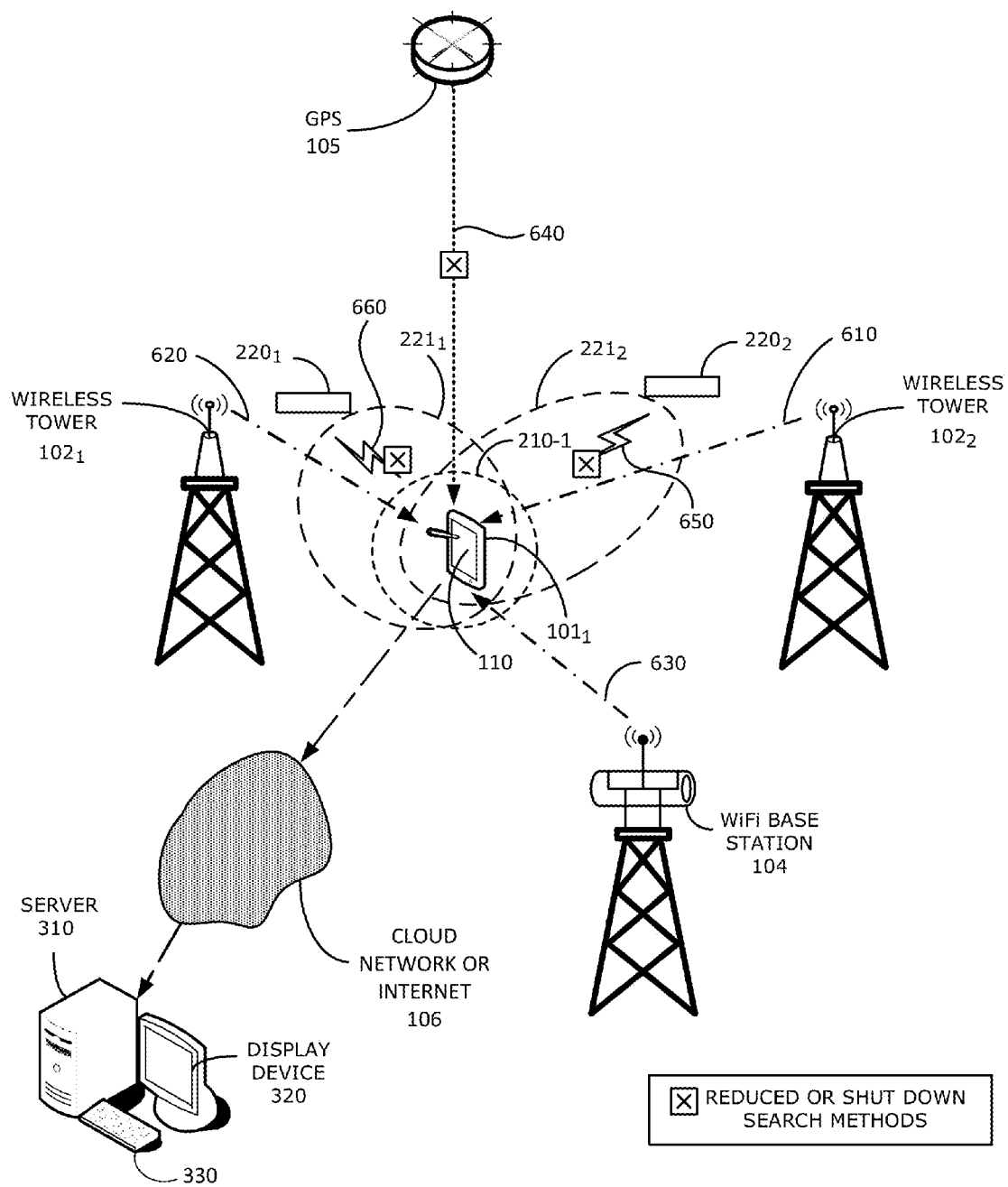
FIG. 6 illustrates the system for providing connection source recommendations using a database of historic data on connectivity to the mobile device $102_1$ from FIG. 4 according to an embodiment of the invention.

FIG. 6 illustrates the system for providing connection source recommendations using a database of historic data on connectivity to the mobile device $102_1$ from FIG. 4 according to an embodiment of the invention. As shown in FIG. 6, the preferred communication source of mobile device $110_1$ of FIG. 4 that is located within region $306_1$ is cell towers $102_1$-$102_3$. Accordingly, the location sensing of the mobile device $110_1$ is using connections 610, 620 and 630 to cell towers $102_1$-$102_3$ and the sensors and/or radios for alternate connections 650 and 660 to the WiFi access points $220_1$-$220_2$ as well as for alternate connection 640 to the GPS 105 are reduced in activity or shut down from performing location fixing searches. Accordingly, the battery power of the mobile device $110_1$ is conserved and the CPU is released (or free) for applications while the mobile device is within the region $306_1$.

Figure 7:
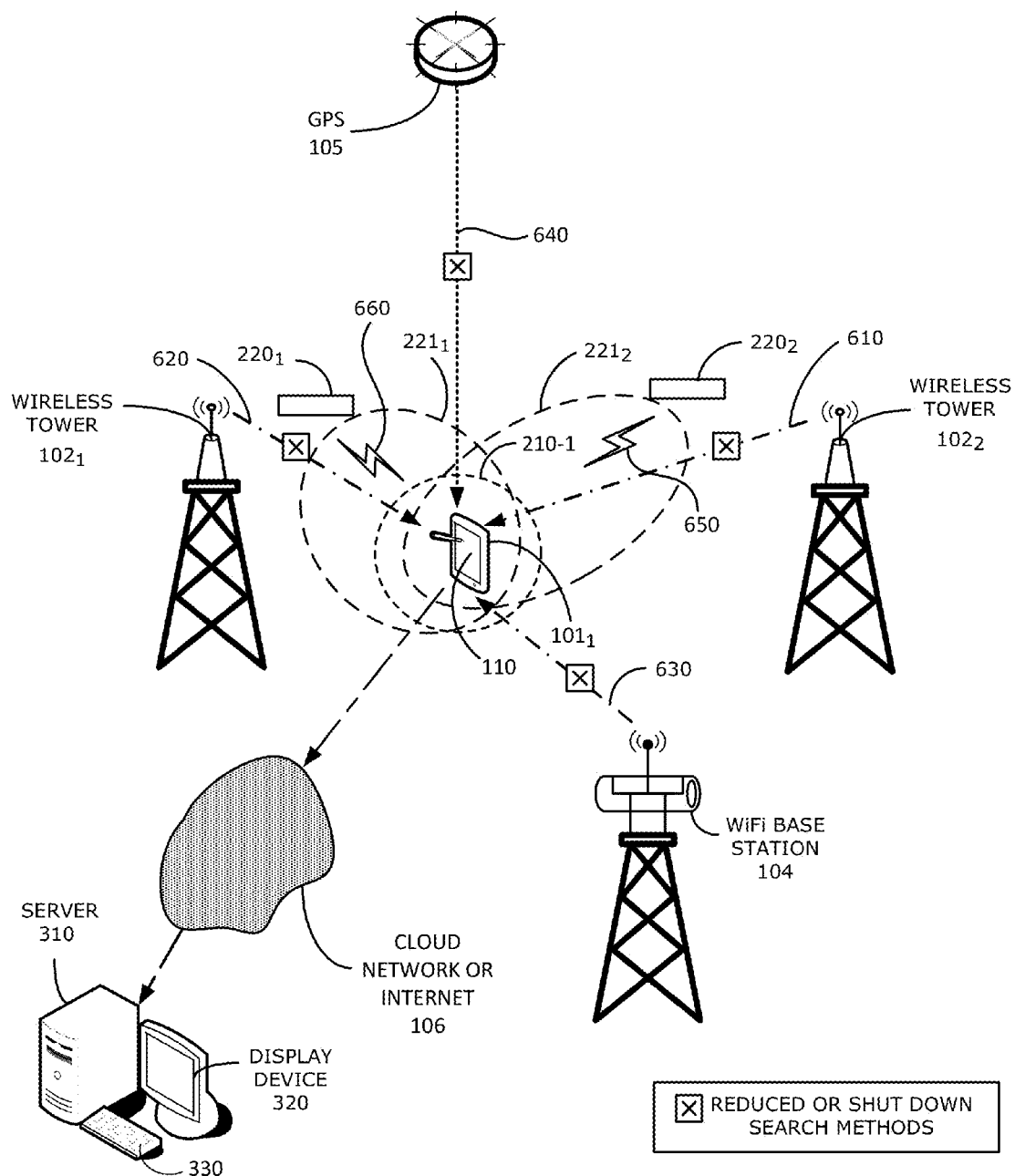
FIG. 7 illustrates the system for providing connection source recommendations using a database of historic data on connectivity to the mobile device $102_2$ from FIG. 4 according to an embodiment of the invention.

Similarly, FIG. 7 illustrates the system for providing connection source recommendations using a database of historic data on connectivity to the mobile device $102_2$ from FIG. 4 according to an embodiment of the invention. As shown in FIG. 7, the preferred communication source of mobile device $110_2$ of FIG. 4 that is located within region $306_3$ is WiFi access points $220_1$-$220_2$. Accordingly, the location sensing of the mobile device $110_2$ is using connections 650, 660 to WiFi access points $220_1$-$220_2$ and the sensors and/or radios for alternate connections 610, 620 and 630 to cell towers $102_1$-$102_3$ and for alternate connection 640 to the GPS 105 are reduced in activity or shut down within regions $306_3$.

Figure 8:
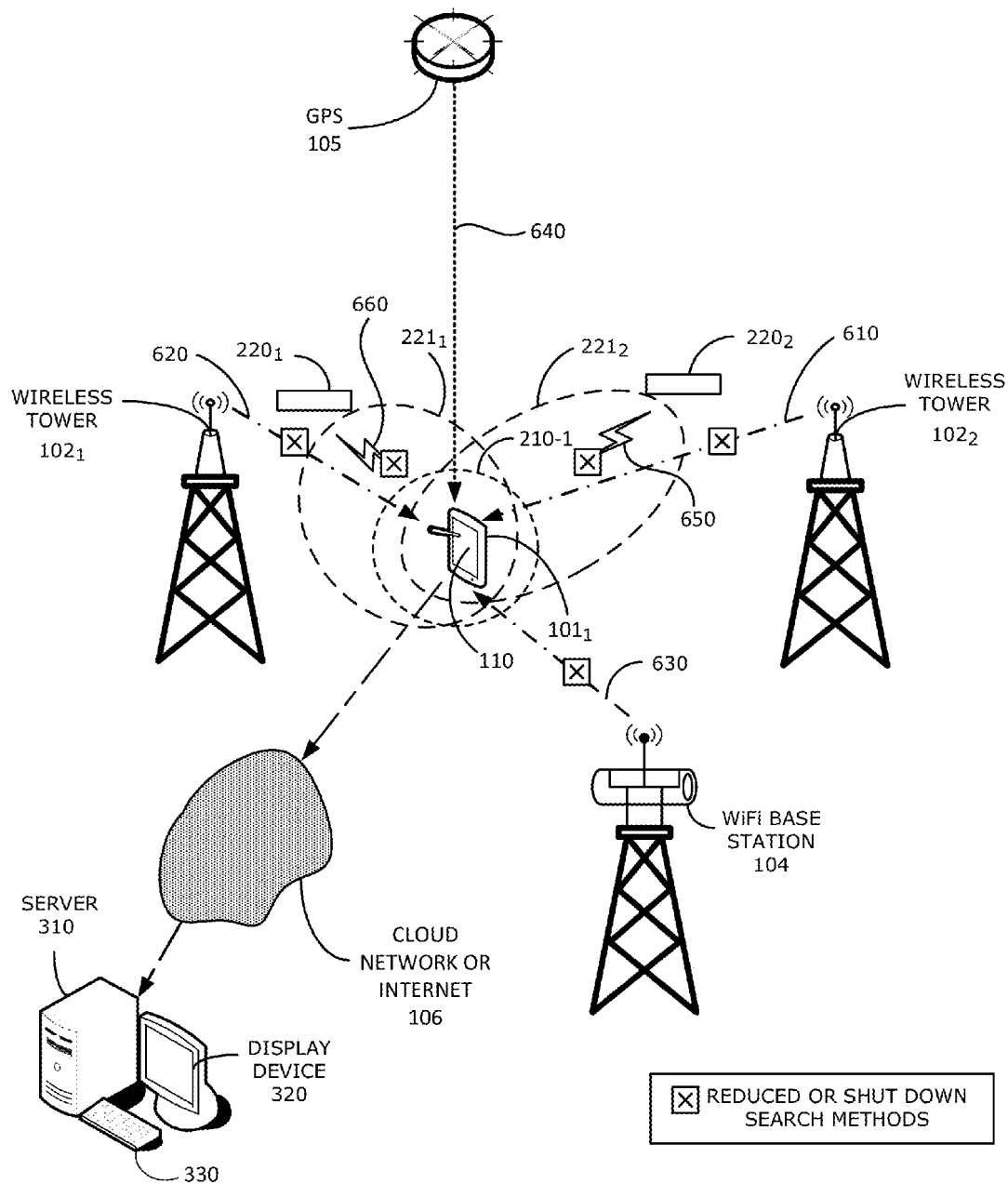
FIG. 8 illustrates the system for providing connection source recommendations using a database of historic data on connectivity to the mobile device $102_3$ from FIG. 4 according to an embodiment of the invention.

Similarly, FIG. 8 illustrates the system for providing connection source recommendations using a database of historic data on connectivity to the mobile device $102_3$ from FIG. 4 according to an embodiment of the invention. As shown in FIG. 8, the preferred communication source of mobile device $110_3$ of FIG. 4 that is located within region $306_2$ is GPS 105. Accordingly, the location sensing of the mobile device $110_2$ is using connection 640 to GPS 105 and the sensors and/or radios for alternate connections 610, 620 and 630 to cell towers $102_1$-$102_3$ and for alternate connection 650, 660 to WiFi access points $220_1$-$220_2$ are reduced in activity or shut down within regions $306_2$.

Figure 5:
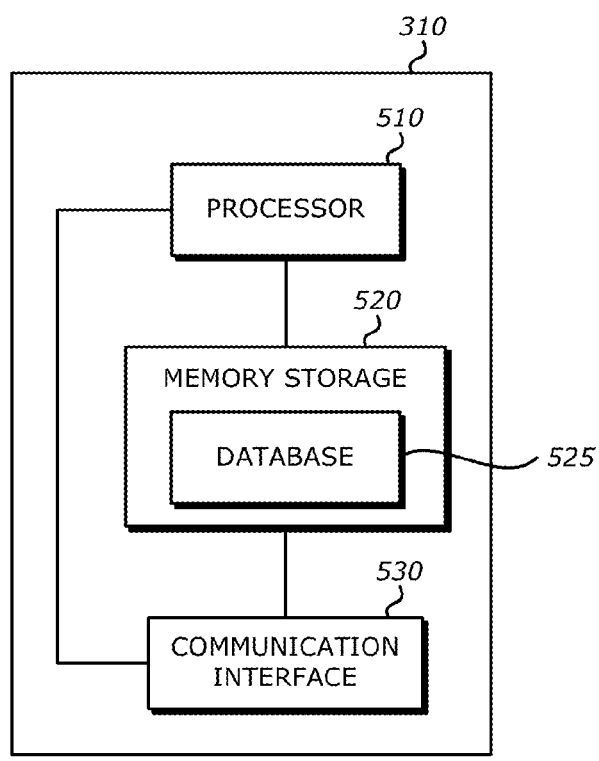
FIG. 5 illustrates exemplary components of server illustrated in FIG. 3 according to an embodiment of the invention.

Referring to back to FIG. 5, which illustrates exemplary components of a server 310 in accordance with aspects of the present disclosure, the server 310 may include a processor 510, memory storage 520, and a communication interface 530.

The communication interface 530 is be a network communication interface that may include a wired network interface such as an IEEE 802.3 Ethernet interface as well as a wireless interface such as an IEEE 802.11 WiFi interface. Data may also be received from any one of a variety of different wireless communications networks and in accordance with any one of several different protocols. These include: a cellular mobile phone network (e.g. a Global System for Mobile communications, GSM, network), including current 2G, 3G, 4G, and LTE networks; and an IEEE 802.11 network (WiFi or Wireless Local Area Network, WLAN). In one embodiment, the communication interface 530 may receive location information and connection information from each of a plurality of mobile devices. The location information from each of the mobile devices may identify a location of each of the mobile devices, respectively. The connection information from each of the mobile devices may identify one of a plurality of connection sources as a preferred connection source used to identify the location of each of the mobile devices, respectively. For instance, the communication interface 530 may receive, from the mobile device $101_1$, a location information including the location 211 and a communication source information identifying the cell towers $102_1$-$102_3$.

The communication interface 530 may also transmit to the mobile devices recommendation signal that include a recommended connection source based on the location of the mobile devices and an analysis of the database included in the server 310. The communication interface 530 may also transmit conservation command signals to mobile devices. The conservation command signals provide commands to each of the mobile devices, respectively, to reduce operation of internal sensors and/or radios required for connection sources other than the preferred connection source for each of the mobile devices, respectively.

In addition, the communication interface 530 may also include input and output interfaces. Various other peripheral units such as the display device 320 and the input unit 330 may be connected to the server 310 via these input and output interfaces to form a computer platform. The peripheral units may include, for example, keyboards, mouse, additional data storage units, printing units and display units.

The processor 510 that is coupled to the communication interface 530 may include a microprocessor, a microcontroller, a digital signal processor, or a central processing unit, and other needed integrated circuits such as glue logic. The term "processor" may refer to a device having two or more processing units or elements, e.g. a CPU with multiple processing cores. The processor 510 may be used to control the operations of the communication interface 530. For example, the processor 510 may be coupled to the communication interface 530 and executes software to control the wireless network communications functionality of the server 310 (e.g. communicating with a network 106 to transmit and receive data to other components of the system (e.g., mobile devices) via the communication interface 530). In some cases, a particular function may be implemented as two or more pieces of software that are being executed by different hardware units of a processor.

In one embodiment, the processor 510 is also coupled to the memory storage 520 that may include one or more different types of storage such as hard disk drive storage, nonvolatile memory, and volatile memory such as dynamic random access memory. The memory storage 520 may also include a database 525 that stores a plurality of location information and a history of connection information for each location information received from mobile devices that are registered with server 310. The database 630 may thus store a history of preferred connection sources in association with locations or regions including a plurality of locations.

The memory device 520 may also store instructions (e.g. software; firmware), which may be executed by the processor 510. In one embodiment, when the instructions stored in memory device 520 are executed by the processor 510, the processor 510 performs methods for providing connection source recommendations using the database 525 of historic data on connectivity. In some embodiments, the processor 510 may receive the location information and the connection information from the communication interface 530, and store, in the database 525, the location information and the connection information. The processor 510 may also control the functions of the communication interface 530 by signaling to the communication interface 530 to transmit the recommended communication source and conservation command signals to the mobile devices. The methods for providing connection source recommendations using the database 525 of historic data on connectivity are discussed in further detail below.

The processor 610, memory storage 620, and communication interface 640 communicate to input devices and output devices via one or more communication links such as a bus. The communication links may also be other wired or wireless communication links. Though in FIG. 3, a single server 310 is shown, it is understood that the server 310 may be a virtual machine, with all the above capabilities, distributed over multiple servers or the cloud computing.

The following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 9:
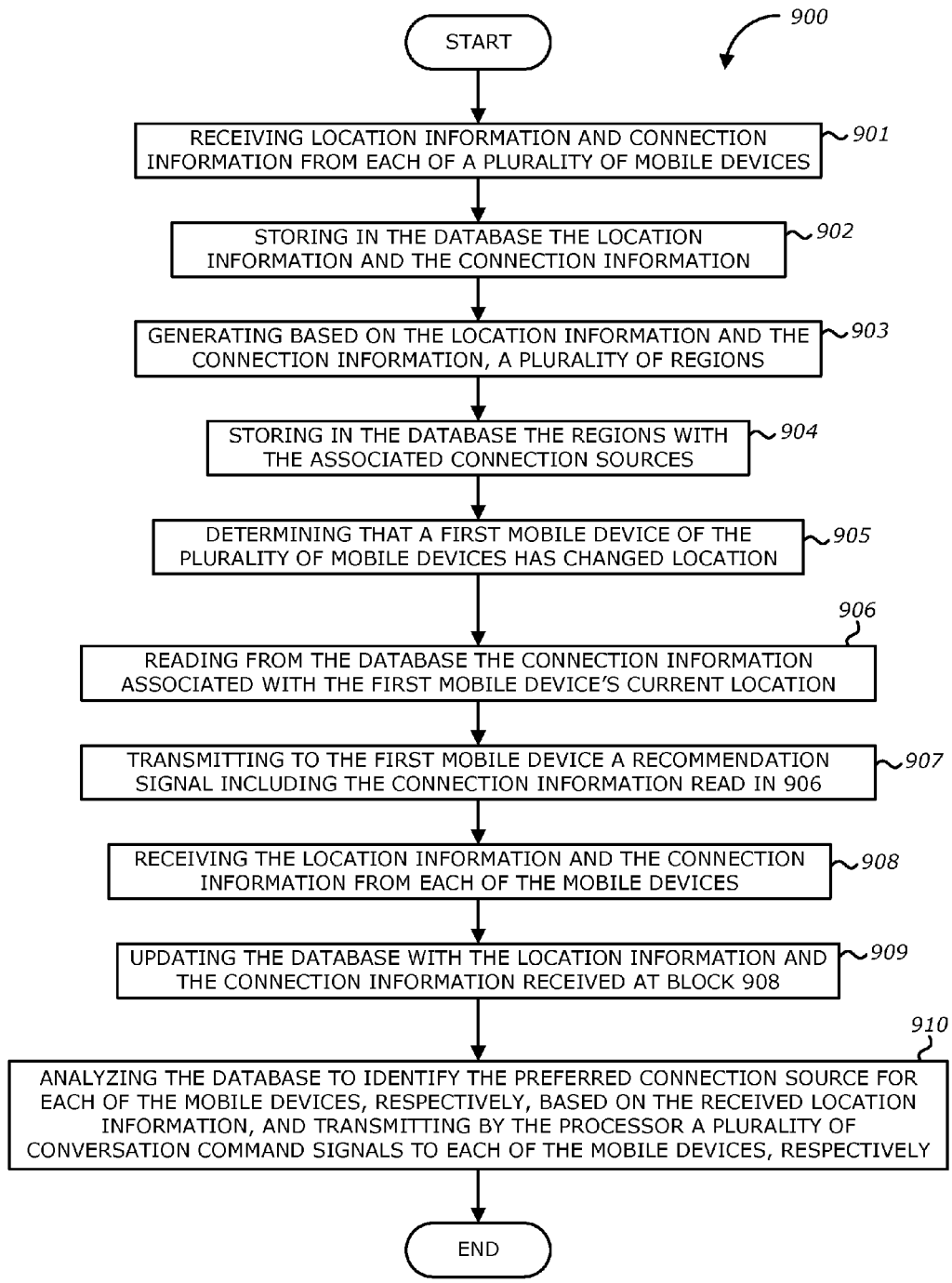
FIG. 9 illustrates a flow diagram of an example method for providing connection source recommendations using a database of historic data on connectivity according to an embodiment of the invention.

FIG. 9 illustrates a flow diagram of an example method for providing connection source recommendations using a database of historic data on connectivity according to an embodiment of the invention. The method 900 starts at Block 901 with the processor of a server receiving location information and connection information from each of a plurality of mobile devices. The location information from each of the mobile devices may identify a location of each of the mobile devices, respectively. The connection information from each of the mobile devices may identify one of a plurality of connection sources as a preferred connection source used to identify the location of each of the mobile devices, respectively. In some embodiments, the connection information from each of the mobile devices identify the connection source having a strongest signal for identifying the location associated with each of the mobile devices, respectively. At Block 902, the processor may store in the database the location information and the connection information. The database may include a plurality of location information and a history of connection information for each location information.

At Block 903, the processor may generate based on the location information and the connection information, a plurality of regions. Each of the regions may include a subgroup of the location information stored in the database that is associated with one of the connection sources as the preferred connection source for that region. For instance, the plurality of regions may include a first region (e.g., region $306_1$ in FIG. 4) associated with a first connection source (e.g., cellular towers $102_1$-$102_3$) and a second region (e.g., region $306_2$ in FIG. 4) associated with a second connection source (e.g., WiFi access points $220_1$-$220_2$). At Block 904, the processor may store in the database the regions with the associated connection sources. In some embodiments, storing the regions in the database include storing the geographic boundaries of the regions with the associated connection sources.

At Block 905, the processor may determine that a first mobile device (e.g., mobile device $110_1$) of the plurality of mobile devices has changed location. Since processor may be continuously informed of the location of the mobile devices in order to track each mobile device's location, the processor may determine that the mobile device has crossed the boundaries of the region in which it was previously located. This determination may be based on a comparison of subsequent location information received from the first mobile device. For instance, the processor may determine that the first mobile device $110_1$ changed location from the first region $306_1$ to the second region $306_2$. At Block 906, the processor may read from the database, the connection information associated with the first mobile device's current location (e.g., the second region). For instance, the processor may read that the second connection source (e.g., GPS 105) is the preferred connection source associated with the second region $306_2$). At Block 907, the processor may transmit to the first mobile device a recommendation signal including the second connection source information. For instance, the processor may transmit the recommendation with an identification of the GPS 105 as the recommended connection source to the first mobile device $110_1$ that has moved and is currently located in region $306_2$.

In some embodiments, upon receiving the recommendation signal, the first mobile device may verify if the second connection source that was identified in the recommendation signal is the preferred connection source. If the second connection source determined to be is the preferred connection source, the first mobile device may establish a connection with the second connection source, and may transmit to the processor the connection information identifying the second connection source as the preferred connection source.

If the second connection source is determined to not be the preferred connection source, the first mobile device may determine which of the available connection sources is the preferred connection source and establishing a connection by the first mobile device to the connection source that is determined to be preferred connection source. For instance, the first mobile device may determine that a third connection source is the preferred connection source, may establish a connection to the third connection source, and may transmit to the processor the connection information identifying the third connection source as the preferred connection source. In some embodiments, the preferred connection source is the connection source that has a strongest signal for identifying the location associated with each of the mobile devices, respectively.

At Block 908, the processor may receive the location information and the connection information from each of the mobile devices. In some embodiments, the connection information received from each of the mobile devices is a verified connection information that identifies the connection source that has been verified by each of the mobile devices to be the preferred connection source. For instance, the processor may receive from the first mobile device the connection information identifying the second connection source being verified as the preferred connection source or the third connection source being determined by the first mobile device as the preferred connection source. At Block 909, the processor updates the database with the location information and the connection information received at Block 908. At Block 910, the processor may analyze the database to identify the preferred connection source for each of the mobile devices, respectively, based on the received location information, and transmitting by the processor a plurality of conservation command signals to each of the mobile devices, respectively. Each of the conservation command signals may be a command to each of the mobile devices, respectively, to reduce operation of internal sensors and/or radios to connection sources other than the preferred connection source for each of the mobile devices, respectively. For instance, if the third mobile device $110_3$ is located in the second region $306_2$, the processor may determine that the preferred connection source for the third mobile device $110_3$ is the GPS 105. Accordingly, the processor may transmit a conservation command signal to the third mobile device $110_3$ that causes the third mobile device $110_3$ to reduce operation of internal sensors or radios to the connection sources other than GPS 105. Accordingly, the third mobile device 110₃ may reduce operation of internal sensors or radios to the WiFi access points 220₁-220₂ and cell towers 112₁-112₃.

An embodiment of the invention may be a machine-readable medium having stored thereon instructions which program a processor to perform some or all of the operations described above. A machine-readable medium may include any mechanism for storing or transmitting information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM). In other embodiments, some of these operations might be performed by specific hardware components that contain hardwired logic. Those operations might alternatively be performed by any combination of programmable computer components and fixed hardware circuit components.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

What is claimed is:

1. A method of providing connection source recommendations using a database of historic data on connectivity comprising:
    receiving, by a processor, location information and connection information from each of a plurality of mobile devices, the plurality of mobile devices including a first mobile device,
        the location information from each of the mobile devices identifying a location of each of the mobile devices, respectively,
        the connection information from each of the mobile devices identifying one of a plurality of connection sources as a preferred connection source used to identify the location of each of the mobile devices, respectively;
    storing by the processor, in the database, the location information and the connection information, wherein the database includes a plurality of location information and a history of connection information for each location information;
    analyzing by the processor the database to identify the preferred connection source for each of the mobile devices, respectively, based on the received location information; and
    transmitting by the processor a plurality of conservation command signals to each of the mobile devices, respectively,
    wherein each of the conservation command signals is a command to each of the mobile devices, respectively, to reduce operation of internal sensors or radios to connection sources other than the preferred connection source for each of the mobile devices, respectively.

2. The method of claim 1, wherein the connection information from each of the mobile devices identify the connection source having a strongest signal for identifying the location associated with each of the mobile devices, respectively.

3. The method of claim 1, further comprising:
    generating by the processor, based on the location information and the connection information, a plurality of regions,
        wherein each of the regions includes a subgroup of the location information stored in the database that is associated with one of the connection sources as the preferred connection source for that region,
        wherein the plurality of regions includes a first region associated with a first connection source and a second region associated with a second connection source; and
    storing by the processor in the database the regions with the associated connection sources.

4. The method of claim 3, further comprising:
    determining, by the processor, that the first mobile device has changed location based on a comparison of subsequent location information received from the first mobile device, wherein the processor determines that the first mobile device changed location from the first region to the second region;
    reading from the database, by the processor, the connection information associated with the second region, wherein the processor reads that the second connection source is the preferred connection source associated with the second region; and
    transmitting by the processor to the first mobile device a recommendation signal including the second connection source information.

5. The method of claim 4, further comprising:
    upon receiving the recommendation signal, verifying by the first mobile device if the second connection source is the preferred connection source;
        if the second connection source is the preferred connection source, establishing a connection by the first mobile device with the second connection source, and transmitting by the first mobile device to the processor the connection information identifying the second connection source as the preferred connection source, and
        if the second connection source is not the preferred connection source, determining by the first mobile device a third connection source as the preferred connection source and establishing a connection by the first mobile device to the third connection source, and transmitting by the first mobile device to the processor the connection information identifying the third connection source as the preferred connection source.

6. The method of claim 5, wherein the preferred connection source is the connection source having a strongest signal for identifying the location associated with each of the mobile devices, respectively.

7. The method of claim 5, further comprising:
    receiving, by the processor, the location information and the connection information from each of the mobile devices, wherein the processor receives from the first mobile device the connection information identifying the second connection source being verified as the preferred connection source or the third connection source being determined by the first mobile device as the preferred connection source; and
    updating by the processor the database with the location information and the connection information received.

8. An apparatus for providing connection source recommendations using a database of historic data on connectivity comprising:
    a processor;

a database including a plurality of location information and a history of connection information for each location information;

a communication interface to:
receive location information and connection information from each of a plurality of mobile devices, the plurality of mobile devices including a first mobile device,
the location information from each of the mobile devices identifying a location of each of the mobile devices, respectively,
the connection information from each of the mobile devices identifying one of a plurality of connection sources as a preferred connection source used to identify the location of each of the mobile devices, respectively; and a memory storage storing instructions that, when executed by the processor, causes the processor to:
receive the location information and the connection information from the communication interface,
store, in the database, the location information and the connection information
analyze the database to identify the preferred connection source for each of the mobile devices, respectively, based on the received location information, and
transmit via the communication interface a plurality of conservation command signals to each of the mobile devices, respectively,
wherein each of the conservation command signals is a command to each of the mobile devices, respectively, to reduce operation of internal sensors or radios required for connection sources other than the preferred connection source for each of the mobile devices, respectively.

9. The apparatus of claim 8, wherein the connection information from each of the mobile devices identify the connection source having a strongest signal for identifying the location associated with each of the mobile devices, respectively.

10. The apparatus of claim 8, wherein the memory storage stores instructions that, when executed by the processor, further causes the processor to:
generate, based on the location information and the connection information, a plurality of regions,
wherein each of the regions includes a subgroup of the location information stored in the database that is associated with one of the connection sources as the preferred connection source for that region,
wherein the plurality of regions includes a first region associated with a first connection source and a second region associated with a second connection source; and
storing by the processor in the database the regions with the associated connection sources.

11. The apparatus of claim 10, wherein the memory storage stores instructions that, when executed by the processor, further causes the processor to:
determine that the first mobile device has changed location based on a comparison of subsequent location information received from the first mobile device, wherein the processor determines that the first mobile device changed location from the first region to the second region;
read from the database the connection information associated with the second region, wherein the processor reads that the second connection source is the preferred connection source associated with the second region; and
transmit via the communication interface to the first mobile device a recommendation signal including the second connection source information.

12. The apparatus of claim 11, wherein the recommendation signal causes the first mobile device to verify if the second connection source is the preferred connection source, wherein
if the second connection source is the preferred connection source, establishing a connection by the first mobile device with the second connection source, and transmitting by the first mobile device to the processor the connection information identifying the second connection source as the preferred connection source, and
if the second connection source is not the preferred connection source, determining by the first mobile device a third connection source as the preferred connection source and establishing a connection by the first mobile device to the third connection source, and transmitting by the first mobile device to the processor the connection information identifying the third connection source as the preferred connection source.

13. The apparatus of claim 12, wherein the preferred connection source is the connection source having a strongest signal for identifying the location associated with each of the mobile devices, respectively.

14. The apparatus of claim 12, wherein the communication interface receives the location information and the connection information from each of the mobile devices, wherein the communication interface receives from the first mobile device the connection information identifying the second connection source being verified as the preferred connection source or the third connection source being determined by the first mobile device as the preferred connection source.

15. The apparatus of claim 14, wherein the memory storage stores instructions that, when executed by the processor, further causes the processor to:
update the database with the location information and the connection information received.

16. A non-transitory computer-readable medium having stored thereon instructions that, when executed by a processor, causes the processor to perform a method of providing connection source recommendations using a database of historic data on connectivity comprising:
receiving, by a processor, location information and connection information from each of a plurality of mobile devices, the plurality of mobile devices including a first mobile device,
the location information from each of the mobile devices identifying a location of each of the mobile devices, respectively,
the connection information from each of the mobile devices identifying one of a plurality of connection sources as a preferred connection source used to identify the location of each of the mobile devices, respectively;
storing by the processor, in the database, the location information and the connection information, wherein the database includes a plurality of location information and a history of connection information for each location information;
analyzing by the processor the database to identify the preferred connection source for each of the mobile devices, respectively, based on the received location information; and
transmitting by the processor a plurality of conservation command signals to each of the mobile devices, respectively, wherein each of the conservation command signals is a command to each of the mobile devices, respectively, to reduce operation of internal sensors or radios to connection sources other than the preferred connection source for each of the mobile devices, respectively.

17. The non-transitory computer-readable medium of claim 16, further comprising:
generating by the processor, based on the location information and the connection information, a plurality of regions,
wherein each of the regions includes a subgroup of the location information stored in the database that is associated with one of the connection sources as the preferred connection source for that region,
wherein the plurality of regions includes a first region associated with a first connection source and a second region associated with a second connection source; and storing by the processor in the database the regions with the associated connection sources.

18. The non-transitory computer-readable medium of claim 17, further comprising:
determining, by the processor, that the first mobile device has changed location based on a comparison of subsequent location information received from the first mobile device, wherein the processor determines that the first mobile device changed location from the first region to the second region;
reading from the database, by the processor, the connection information associated with the second region, wherein the processor reads that the second connection source is the preferred connection source associated with the second region; and
transmitting by the processor to the first mobile device a recommendation signal including the second connection source information.

* * * * *